United States Patent
Börsch et al.

(10) Patent No.: US 6,672,768 B2
(45) Date of Patent: Jan. 6, 2004

(54) INTERMEDIATE BEARING

(75) Inventors: Oliver Börsch, Essen (DE); Harald Dierich, Bochum (DE); Ralf Sedlmeier, Pleidelsheim (DE)

(73) Assignee: Spicer Gelenkwellenbau GmbH & Co. KG (DE)

( * ) Notice: Subject to any disclaimer, the term of this patent is extended or adjusted under 35 U.S.C. 154(b) by 0 days.

(21) Appl. No.: 09/748,703

(22) Filed: Dec. 22, 2000

(65) Prior Publication Data
US 2001/0017954 A1 Aug. 30, 2001

(30) Foreign Application Priority Data

Dec. 24, 1999 (DE) .......................................... 199 63 140

(51) Int. Cl.⁷ .............................................. F16C 27/00
(52) U.S. Cl. .................................... 384/536; 267/140.2
(58) Field of Search .................................. 384/220, 222, 384/441, 434, 536, 582, 626; 180/381; 267/141.2, 141.3, 140.2; 464/180

(56) References Cited

U.S. PATENT DOCUMENTS

| | | | | |
|---|---|---|---|---|
| 1,345,063 A | * | 6/1920 | Bergland ..................... | 384/441 |
| 1,650,045 A | * | 11/1927 | Riise ........................ | 267/141.2 |
| 2,580,119 A | * | 12/1951 | Meyers ....................... | 384/222 |
| 2,872,253 A | * | 2/1959 | Foote et al. ................. | 384/434 |
| 3,325,230 A | | 6/1967 | Caunt | |
| 3,601,459 A | * | 8/1971 | Cutting ...................... | 384/222 |
| 3,711,168 A | * | 1/1973 | Wendel et al. ............... | 384/222 |
| 3,940,192 A | * | 2/1976 | Hagele ....................... | 384/517 |
| 4,083,580 A | * | 4/1978 | Shaner ....................... | 267/276 |
| 4,542,996 A | * | 9/1985 | Brissette et al. ............ | 384/536 |
| 5,703,796 A | * | 12/1997 | Moradi et al. ............... | 180/381 |

FOREIGN PATENT DOCUMENTS

| | | |
|---|---|---|
| DE | 2061625 | 6/1972 |
| DE | 8112477 | 8/1981 |
| DE | 3701886 A1 | 8/1988 |
| DE | 37 01 887 A1 | 8/1988 |
| DE | 3832543 A1 | 4/1990 |
| DE | 29601337 U1 | 5/1996 |
| GB | 1341087 | 12/1973 |
| JP | 10169655 | 6/1998 |

* cited by examiner

Primary Examiner—David A. Bucci
Assistant Examiner—Timothy McAnulty
(74) Attorney, Agent, or Firm—MacMillan, Sobanski & Todd, LLC

(57) ABSTRACT

An intermediate bearing for a driveline of a commercial vehicle has a housing (7) with a stirrup-shaped cross-section. The housing (7) has a fixing face (12) formed of two straight portions (8, 9) and a first arched portion (10). A bearing member (15) is arranged between the portions (8, 9, 10). The bearing member (15) is rubber and is connected to the fixing face (12) by vulcanization. A locking element (23) bridges the space between the two straight portions (8, 9). The locking member (23) is attached to the bearing member (15). The bearing member (15) encloses a supporting ring (16) which serves to receive a rolling contact bearing. The locking element (23) is adjustable for the purpose of setting a pre-tension of the bearing member (15) towards the longitudinal axis (18) of the bore (17) of the supporting ring (16). The locking element (23) can be connected to the housing (7) after the required pre-tension has been set.

8 Claims, 3 Drawing Sheets

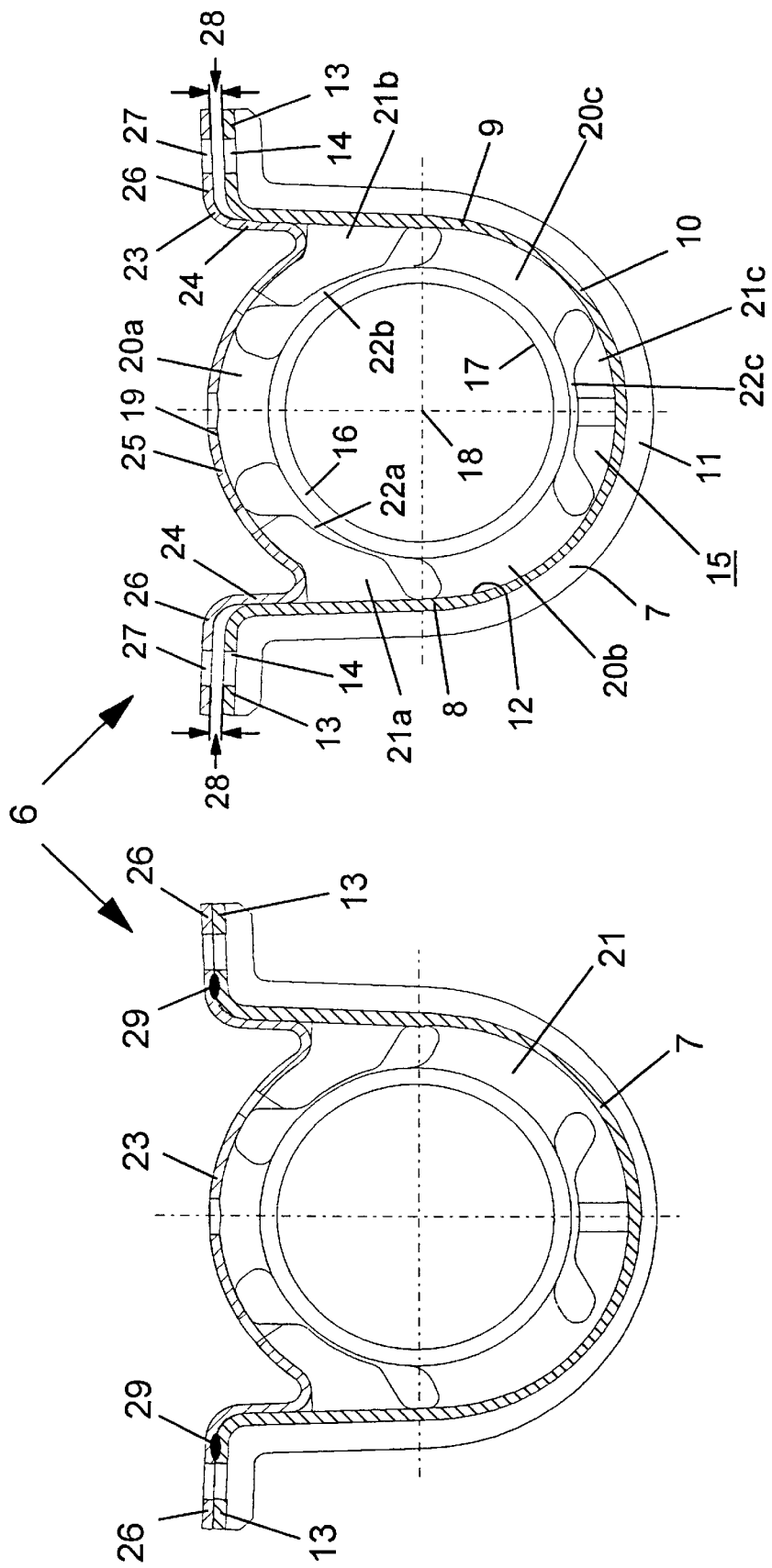

INTERMEDIATE BEARING

CROSS REFERENCE TO RELATED APPLICATION

This application is based upon and claims priority to German Patent Application 199 63 140.9 filed Dec. 24, 1999, which application is herein expressly incorporated by reference.

BACKGROUND OF THE INVENTION

The invention relates to an intermediate bearing for a driveline of a motor vehicle, especially a commercial vehicle.

The driveline that extends from a gearbox positioned in front to the axle differential to drive the wheels of a commercial vehicle is normally of a multi-component nature with portions of universal-jointed shafts. This means that an intermediate bearing is required.

DE 37 01 887 A1 describes an intermediate bearing for a driveline. The intermediate bearing includes a housing where a resilient bearing member is accommodated in a form-fitting way. The bearing member encloses a supporting ring. A rolling contact bearing is arranged in the supporting ring to support the associated driveshaft portions. The bearing member has circumferentially distributed apertures which serve to receive filler members. By inserting the filler members, it is possible to adapt the stiffness and damping properties of the intermediate bearing to different applications. The disadvantage of this design is that such adaptation is complicated and expensive.

U.S. Pat. No. 3,325,230 describes an intermediate bearing with an outer housing, an inner housing and a rubber element arranged therebetween. The outer housing is either in one part in the form of a casting or it is of a U-shaped first plate metal part and a strip-shaped second plate metal part. The two parts are firmly connected to one another by spot welding. The inner housing includes segments and serves to accommodate the outer race of a rolling contact bearing. The individual segments have flange-like radially inwardly extending lips that axially hold the outer race of the rolling contact bearing. The outer bearing race can be fitted by moving the segments radially outwardly. The rubber element or the rubber element portions supporting the respective cup is/are radially pre-tensioned. Thus, the outer bearing race, with its outer diameter, is able to pass the region of the inwardly directed flange-like lips. In the fitted condition, it is possible not to provide any pre-tension at all. However, a pre-tension is preferably provided such that the outer race does not rotate if the shaft received in the inner bearing race rotates. The objective is to avoid any mating rust.

SUMMARY OF THE INVENTION

It is an object of the present invention to propose an intermediate bearing which can easily be adapted to different damping requirements.

In accordance with the invention, an intermediate bearing includes a housing. The housing has a stirrup-shaped cross-section. The housing has a fixing face with two straight portions and a first arched portion connecting the two straight portions. A resilient bearing member extends between a supporting ring enclosed by the resilient bearing member and the fixing face. The resilient bearing member is a rubber-like material. A locking element bridges the space between the two straight portions. The locking element includes a supporting face adapted to the opposed outer face portion of the bearing member. The supporting ring has a bore to receive a rolling contact bearing. The bore defines a longitudinal axis. The locking element is adjustable to set the pretension of the bearing member towards the longitudinal axis. The bearing member, in the pretension-free condition, is at least partially connected by adhesion to the fixing face of the housing, the supporting face of the locking element and to the supporting ring.

An advantage of this embodiment is that the required characteristics can be achieved merely by determining the respective dimension of the compression of the bearing member. The adhesion connection prevents any movement between the bearing member and the housing on the one hand and the supporting ring on the other. A further advantage is that no wear occurs in the contact regions. Damping effects are generated in the bearing member only and not in the region of contact. Longer axial paths to be accommodated by the bearing member can be permitted. Furthermore, assembly in the vehicle is facilitated because the parts are firmly associated with one another. Such firm association also means that, in the case of misalignments in the vehicle, no influence is exerted on the way in which the components are held and function. It is possible to produce an axially soft bearing.

According to a further embodiment of the invention, the bearing member is connected to the supporting ring by individual supporting portions. The supporting portions are distributed around the longitudinal axis. The load is preferably distributed onto a plurality of supporting portions in the main direction of load application.

In order to achieve a progressive characteristic curve of the bearing member with respect to damping in the radial direction, the bearing member is connected by supporting portions, distributed around the longitudinal axis, to the supporting ring and to the housing. The design selected for this purpose is such that the gap relative to the buffers is greater prior to the assembly of the driveshaft than after the assembly of the driveshaft. The weight of the driveshaft reduces the gap in the direction of load application. The change in position caused by the weight is taken into account. Thus, in the mounted condition of the driveshaft, all buffers are positioned at the same distance from the outer face of the supporting ring.

To facilitate the compression of the bearing member, the locking element is held between the two straight portions of the fixing face. The locking element can be fixed at the housing in a position which corresponds to the selected pre-tension. This can be achieved by low-heat welding methods for example, laser welding. A simple possibility to achieve the pre-tension exists if, for each straight portion, the housing is provided with an angled flange portion and if the locking element includes holding portions, which extend parallel to the flange portions, with the flange portions covering the holding portions. Both are arranged with a gap therebetween as long as the intermediate bearing is in the pre-tension-free condition. The gap between the holding portion and the flange portion is designed to accommodate the greatest possible pre-tension. Thus, the flange portions and the holding portions may come into contact with one another and may be connected to one another.

For other applications which require less pre-tension, it is possible to insert intermediate layers. As an alternative to a welded connection, it is also possible to use a connection where the corresponding through-bores, provided in the flange portions and in the holding portions which also applies to cases where intermediate layers are used, are passed through by hollow-rivet-like sleeves. The ends of the sleeves are deformed in a collar-like way and press the parts together. The through-bore which is then still in existence can be used to bolt the intermediate bearing by bolts against a transverse bar or holding blocks at the vehicle.

An adhesive may be provided to connect the bearing member to the locking element and to the housing. Alternatively, it is possible, when forming the rubber bearing member, to insert the housing and the locking member into the mold. The rubber is then injected into the mold to connect the housing and locking member to the bearing member by vulcanization when vulcanizing the bearing member.

Pre-tensioning the bearing member is simplified if the two straight portions diverge, starting from the arched portion. The arched portion, in cooperation with the straight portions, ensures that even in those bearing member regions which are remote from the locking element the required pre-tension is achieved. The pre-tension is preferably calculated such that for the highest load occurring in a particular application, all supporting portions of the bearing member, which are connected to the supporting ring are largely tensile-stress-free. Ideally, internal compressive stresses in the bearing member only exist in order to prevent, as a result of the bearing member being connected to the locking elements or the housing, tensile forces that occur to the extent that they destroy the connection between the parts and the bearing member.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein:

FIG. 2 is a cross-section view through an inventive intermediate bearing after having been produced, but prior to the bearing member being pre-tensioned.

FIG. 3 is a cross-section view according to FIG. 2 in a pre-tensioned condition.

DETAILED DESCRIPTION OF THE PREFERRED EMBODIMENT

Figure 1:
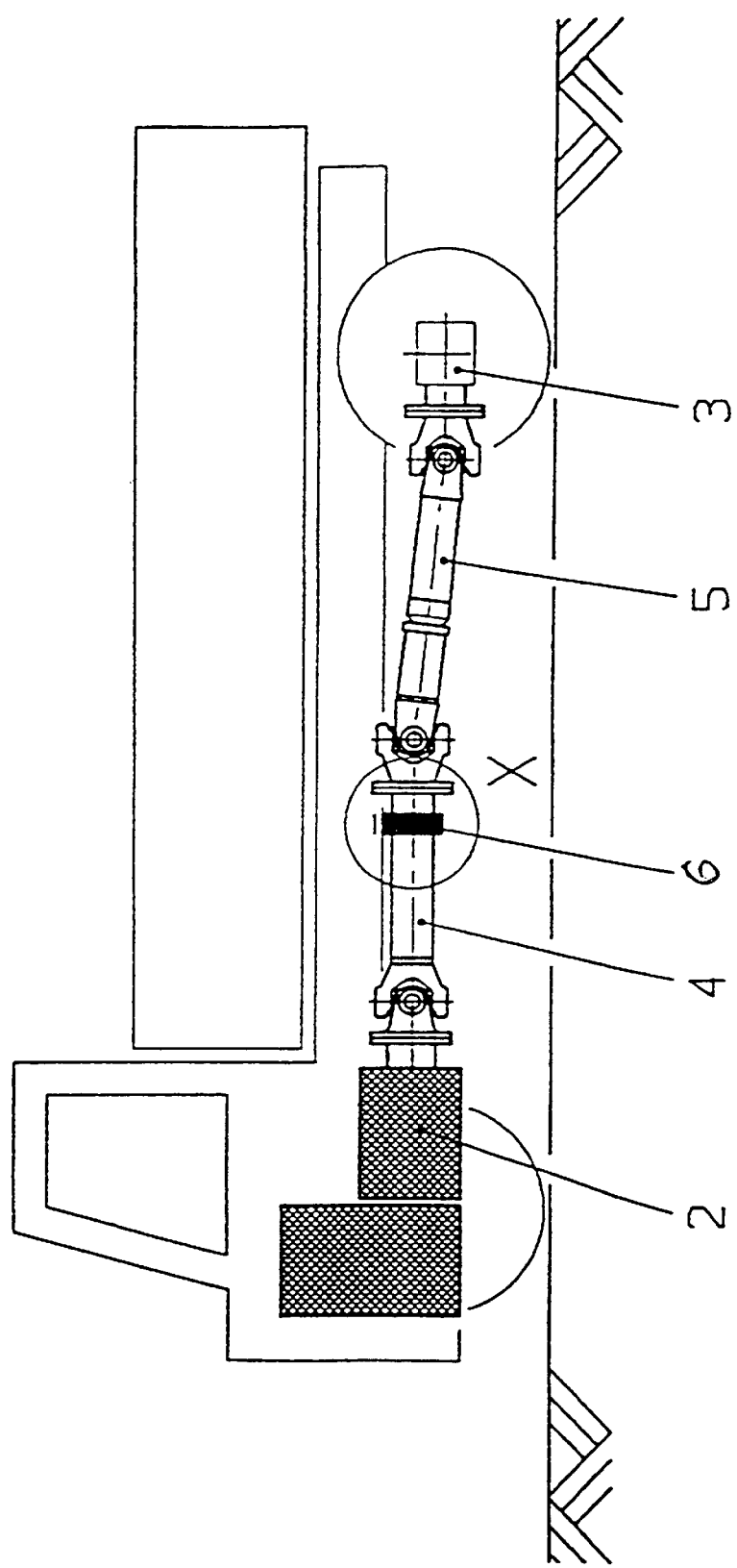
FIG. 1 is a diagrammatic view of a commercial vehicle having a driveline for driving the rear wheels.

FIG. 1 shows a commercial vehicle 1 having a front gearbox 2 driven by an engine. A driveline is connected to the rear wheel differential 3 associated with the rear wheels to drive the same. The driveline has a first driveshaft portion 4 and a second driveshaft 5 angled relative to the first driveshaft portion 4. At its end remote from the gearbox 2, the first driveshaft portion 4 is supported in an intermediate bearing 6. The bearing 6 is shown in the form of an enlarged detail in FIGS. 2 to 4 and will be explained in greater detail with reference thereto.

The intermediate bearing 6 includes a housing 7 which extends substantially in a U-shaped and stirrup-like way in cross-section as shown in FIG. 2. The housing 7 has a fixing face 12 that extends into the drawing plane. The fixing face includes two straight portions 8, 9 and a first arched portion 10 connecting the straight portions 8, 9. The edges of the portions 8, 9, 10 are angled and form stiffening portions 11. The free ends of the two straight portions 8, 9, which slightly diverge from the first arched portion 10, change into outwardly angled flange portions 13. The flange portions 13 each include a through-bore 14 to allow a fixing bolt to pass through.

A bearing member 15 is accommodated between the two straight portions 8, 9 and the first arched portion 10. The bearing member 15 is of a rubber material. During the vulcanization of the bearing member 15, the bearing member 15 is adheringly connected to the fixing face 12.

The bearing member 15 encloses a supporting ring 16 whose bore 17 defines a longitudinal axis 18. The bore 17 serves to receive a rolling contact bearing which supports the first driveshaft portion 4, shown in FIG. 1. The bearing member 15, at its outer face portion 19, is also connected by vulcanization to a second arched portion 25 of a locking element 23. It can be seen that the bearing member 15 is provided with recesses that extend parallel to the longitudinal axis 18.

Three supporting portions 20a, 20b, 20c are formed that permanently support the supporting ring 16 in the housing 7. The supporting portion 20a is arranged in the region of the vertical central plane of the intermediate bearing 6 above the supporting ring 16. The two other supporting portions 20b, 20c are arranged at an angle relative to the central plane and underneath the supporting ring 16. Buffers 21a, 21b, 21c are provided between the supporting portions 20a, 20b, 20c of the bearing member 15. The buffers 21a, 21b, 21c are securely connected by vulcanization to the fixing face 12 only. The buffers 21a, 21b, 21c are not connected to the outer circumferential face of the supporting ring 16. The buffers 21a, 21b, 21c are arranged at a distance 22a, 22b, 22c from the supporting ring 16. It can be seen in FIG. 2 that, in the untensioned condition, the distances 22a, 22b vary in the circumferential direction of the supporting ring 16. Even in the tensioned condition, as can be seen in FIG. 3, the distance 22c is greater than the now constant distances 22a, 22b. However, if the driveline is carried by the intermediate bearing, the distances 22a, 22b, 22c assume approximately the same values. If the load in the radial direction is greater, the supporting ring 16 comes to rest against one of the buffers 21a, 21b, 21c, so that the characteristic spring curve of the bearing member 15 changes.

The locking element 23 includes angled guiding portions 24. The guiding portions 24 start from the second arched portion 25. The locking element 23 is guided by the portions 24 between the two straight portions 8, 9 of the fixing face 12 of the housing 7. Two holding portions 26 extend from the two guiding portions 24. The holding portions 26 are angled relative to the guiding portions 24. The holding portions 26 extend approximately parallel relative to the two flange portions 13 of the housing 7. The flange portions 26 are provided with through-bores 27 which correspond to the through-bores 14 of the flange portions 13.

A gap 28 exists between the faces of the flange portions 13 facing the holding portions 26. In this position, the bearing member 15 is tension-free, i.e. it is not pre-tensioned. FIG. 2 shows a production stage of the intermediate bearing 6. The pre-tension of the bearing member 15 is achieved in that the latter is loaded by the locking element 23 by pushing the locking element 23 further towards the longitudinal axis 18. Such loading can continue until the gap 28 is reduced to zero, as shown in FIG. 3. The gap 28 shown in FIG. 2 is the gap which represents the distance which can be covered by the locking element 23 relative to the housing 7 to achieve the maximum pre-tension of the bearing member 15. This condition can be fixed by welding the locking element 23 to the housing 7 in the region of the holding portions 26 and of the flange portions 13. For this purpose, it is possible to apply a low-heat welding method such as laser welding. FIG. 3 shows two welding regions 29 for connecting the housing 7 to the locking element 23.

Figure 4:
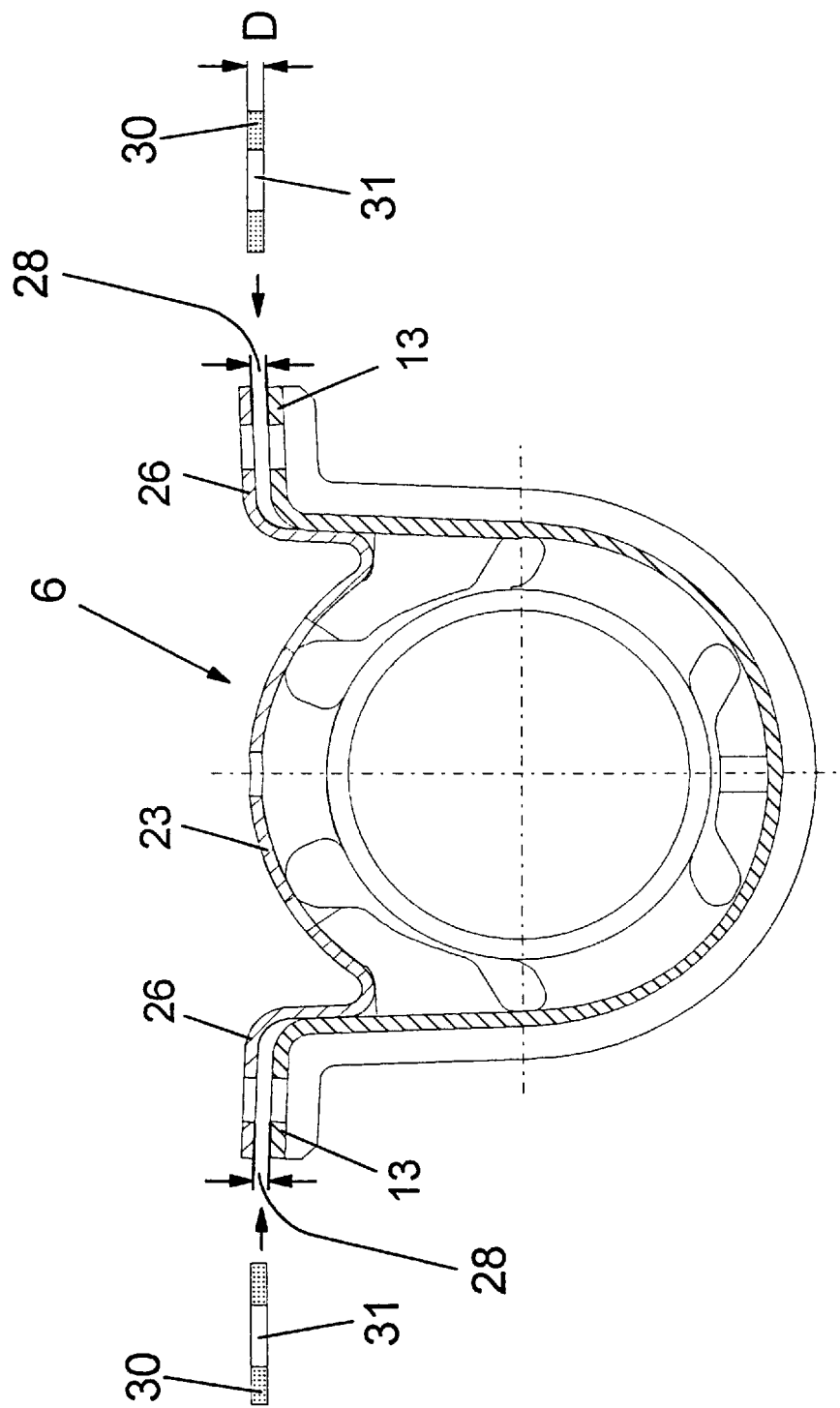
FIG. 4 is a cross-section view according to FIG. 2 complemented by intermediate layers inserted into the gap to set a pre-tension.

If, with respect of pre-tension, intermediate positions are to be put into effect, it is possible to use intermediate layers or spacers 30. The layers 30 have a thickness D, as shown in FIG. 4. The thickness D is smaller than the dimension of the gap 28. The intermediate layers 30 have through-bores 31 and can be inserted into the gap 28 between the holding portions 26 and the flange portions 13. Thereafter, the locking element 23 can be displaced so that the holding portions 26 rest against the intermediate layers 30. It is then possible to connect the holding portions 26 and the intermediate layers 30 to the flange portions 13 in the same way as described in connection with FIG. 3. The intermediate bearing 6 is then set to a lower pre-tension value which is lower than that shown in FIG. 3. After the intermediate layers 30 have been inserted into the gap 28, the through-bores 31 are aligned such that they correspond to the through-bores 14, 27 in the holding portions 26 and the flange portions 13, respectively. Thus, it is possible to use fixing bolts to fix the intermediate bearing 6 to a vehicle frame.

Alternatively, it is possible to effect a connection wherein a connecting sleeve is inserted into the through-bores. The connecting sleeve, at one end, is provided with a collar. The other end is deformed such that a collar is formed. The parts are pressed together. Such connecting sleeves can also be used for guiding through fixing bolts.

While the above detailed description describes the preferred embodiment of the present invention, the invention is susceptible to modification, variation and alteration without deviating from the scope and fair meaning of the subjoined claims.

What is claimed is:

1. An intermediate bearing for a driveline of a motor vehicle comprising:

a supporting ring including a bore for receiving a rolling contact bearing;

a resilient bearing member disposed about said supporting ring;

a housing extending about a first portion of said resilient bearing member;

a locking element extending about a second portion of said resilient bearing member; and a spacer disposed between said locking element and said housing for positioning said locking element at a predetermined position relative to said housing such that said resilient bearing member is compressed therebetween at a selected pre-tension.

2. The intermediate bearing defined in claim 1 wherein said resilient bearing member is connected by supporting portions to said supporting ring and to said housing.

3. The intermediate bearing defined in claim 2 wherein a plurality of buffers is disposed between said supporting portions, said buffers being connected by adhesion to said housing.

4. The intermediate bearing defined in claim 1 wherein said locking element extends between two straight portions provided on said housing.

5. The intermediate bearing defined in claim 1 wherein said housing includes a flange portion, said locking element includes a holding portion that extends generally parallel relative to said flange portion, and said spacer is disposed between said flange portion and said holding portion.

6. The intermediate bearing defined in claim 1 wherein said housing includes a pair of flange portions, said locking element includes a pair of holding portions that extend generally parallel relative to said flange portions, and a pair of spacers are disposed between said flange portions and said holding portions.

7. The intermediate bearing defined in claim 6 wherein said flange portion and said holding portion have respective bores formed therethrough that are aligned with one another.

8. The intermediate bearing defined in claim 1 wherein said resilient bearing member is adhesion-connected to said locking element, said housing, and said supporting ring by glue or vulcanization.

* * * * *